United States Patent [19]

Yoshinaga et al.

[11] Patent Number: 5,339,306
[45] Date of Patent: Aug. 16, 1994

[54] DETECTING INTERFERENTIAL DIFFRACTION OF A REFLECTED BEAM FROM A POLYMER LIQUID CRYSTAL RECORDING MEDIUM

[75] Inventors: Kazuo Yoshinaga, Machida; Katsuya Oikawa, Yokohama; Toshikazu Ohnishi, Tokyo, all of Japan

[73] Assignee: Canon Kabushiki Kaisha, Tokyo, Japan

[21] Appl. No.: 892,657

[22] Filed: Jun. 3, 1992

Related U.S. Application Data

[62] Division of Ser. No. 514,965, Apr. 26, 1990, abandoned.

[51] Int. Cl.$^5$ .............................................. G11B 7/00
[52] U.S. Cl. ................... 369/275.1; 369/100; 369/109; 369/288
[58] Field of Search .................... 428/64, 65, 813.1; 430/19, 20, 495, 945; 369/100, 288, 275.1, 109; 346/135.1

[56] References Cited

U.S. PATENT DOCUMENTS

| | | | |
|---|---|---|---|
| 4,115,809 | 9/1978 | Ueno | 369/112 |
| 4,305,081 | 12/1981 | Spong | 346/135 |
| 4,329,697 | 5/1982 | Bell | 346/135 |
| 4,398,203 | 8/1983 | Cornet | 369/100 |
| 4,933,243 | 6/1990 | Hara et al. | 428/1 |
| 4,965,591 | 10/1990 | Kurabayashi et al. | 346/135.1 |
| 5,019,476 | 5/1991 | Kanno et al. | 346/135.1 |
| 5,124,183 | 6/1992 | Nakano et al. | 346/135.1 |
| 5,141,785 | 8/1992 | Yoshinada et al. | 346/135.1 |

FOREIGN PATENT DOCUMENTS

| | | |
|---|---|---|
| 10930 | 1/1984 | Japan . |
| 35989 | 2/1984 | Japan . |
| 154340 | 7/1987 | Japan . |
| 1040380 | 2/1989 | Japan . |
| 1162245 | 6/1989 | Japan . |
| 2059394 | 2/1990 | Japan . |

*Primary Examiner*—Paul M. Dzierzynski
*Assistant Examiner*—Kim-Kwok Chu
*Attorney, Agent, or Firm*—Fitzpatrick, Cella, Harper & Scinto

[57] ABSTRACT

A memory medium includes a memory layer of a polymer liquid crystal and a reflection layer disposed on a substrate. A record part having a different refractive index from that of a non-record part is formed in the memory layer so that the record part and the non-record part have a difference in optical thickness of the memory layer. In a reproduction step, the memory medium is irradiated with a reproduction beam of coherent light so that the reproduction beam is transmitted through the memory layer, reflected at the reflection layer and re-transmitted through the memory layer, during which the reproduction beam is subjected to interferential diffraction due to the optical thickness difference between the record part and the non-record part to allow readout of the recorded data.

7 Claims, 1 Drawing Sheet

DETECTING INTERFERENTIAL DIFFRACTION OF A REFLECTED BEAM FROM A POLYMER LIQUID CRYSTAL RECORDING MEDIUM

This application is a division of application Ser. No. 514,965, filed Apr. 26, 1990, now abandoned.

FIELD OF THE INVENTION AND RELATED ART

The present invention relates to an optical memory or optical recording and reproduction system. More particularly, the present invention relates to a writable and rewritable optical memory medium having a memory layer comprising a polymer liquid crystal, and an optical recording and reproduction system using the optical recording medium.

At present, the optical memory system has been commercialized because of its large capacity and random accessibility. A variety of types of the system have been commercialized including the type of reproduction only such as the digital audio disk (compact disk CD) and the laser video disk (LD). Further, commercial examples of the type allowing optical recording include the writable optical disk (WO) and the optical card (OC), which utilize phase transition of a metal film or pit formation in an organic dye film.

At present, research on the rewritable-type optical disk has been developed, including one using an opto-magnetic effect and one using a phase transition, of which the commercialization has been aimed at. Further, a polymer liquid crystal has been also proposed as a data recording medium (Japanese Laid-Open Pat. Applns. JP-A 59-10930, 59-35989 and 62-154340).

Among the above, the compact disk(CD) has been the most developed one commercially.

The compact disk (CD), which is an optical memory medium for reproduction only, requires only a simple optical system which has been made compact. However, CD requires complicated production steps and is not adapted to production in a small quantity. In order to overcome such a difficulty, a writable-type CD using phase transition of a metal film or pit formation in an organic dye film as used in the writable-type optical disk (WO) has been proposed as being suitable for production in a small quantity. However, the writable-type CD involves several difficulties, such as lower reflectivity and contrast than the conventional CD and also requires a complicated structure thereof and a complicated optical system than the conventional CD. Furthermore, the writable-type CD cannot be read by the current CD reproduction or readout system.

SUMMARY OF THE INVENTION

In view of the above-mentioned problems accompanying the conventional memory media, an object of the present invention is to provide a writable and rewritable optical memory or recording medium requiring only a simple optical system for recording and/or reproduction.

Further objects of the present invention are to provide a recording method suitable for the memory medium and an optical recording and/or reproduction system suitable for the memory medium.

According to a principal aspect of the present invention, there is provided a memory medium including a memory layer comprising a polymer liquid crystal and a reflection layer disposed on a substrate so that a reproduction beam is transmitted through the memory layer, reflected at the reflection layer and re-transmitted through the memory layer, wherein the memory layer comprises a non-record portion and a record portion. The non-record portion generally comprises a record pit having a refractive index changed from that of the non-record portion so that the non-record portion and the record portion have a difference in optical thickness of the memory layer suitable for causing interferential diffraction of a reproduction beam of coherent light incident to the record portion and the non-record portion to allow readout of the recorded data.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
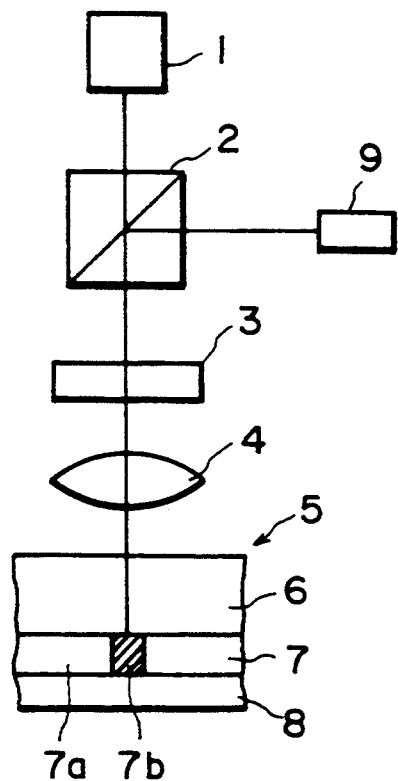
FIG. 1 illustrates a recording and/or reproduction system including a memory medium according to the present invention.

The memory layer of the memory medium according to the present invention may suitably comprise a thermotropic polymer liquid crystal. Examples thereof may include a side chain-type polymer liquid crystal which comprise a main chain of a methacrylic acid polymer, a siloxane polymer, etc., and a mesogen or low-molecular weight liquid crystal unit in side chains thereof like pendants; and also a main chain-type polymer liquid crystal comprising a mesogen unit in its main chain, such as those of the polyester-type or polyamide-type, as used in the field of high-strength and high-modulus, heat-resistant fiber or resin.

These polymer liquid crystals may assume smectic phase, nematic phase, cholesteric phase or another phase or can also be a discotic liquid crystal.

Specific examples of the polymer liquid crystal used in the present invention are enumerated hereinbelow while other polymer liquid crystals can also be used in the present invention.

(In the following formulas (1)–(13), p=5–1000, $1 \leq n_1 \leq 15$)

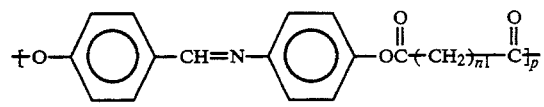

(1)

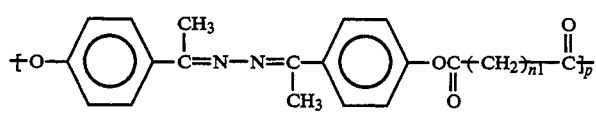  (2)
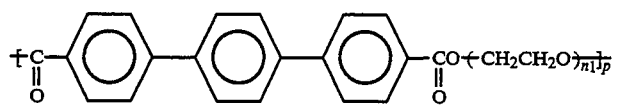  (3)
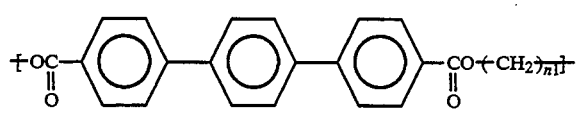  (4)
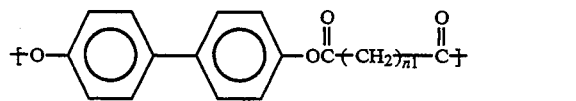  (5)
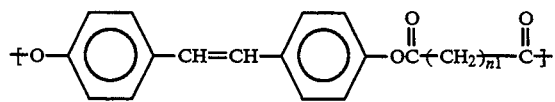  (6)
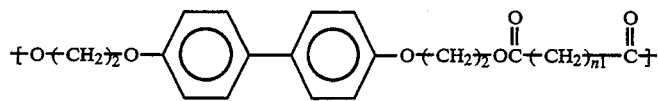  (7)
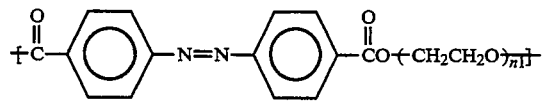  (8)
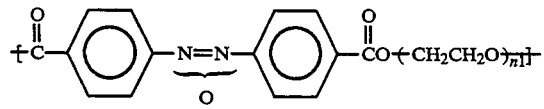  (9)
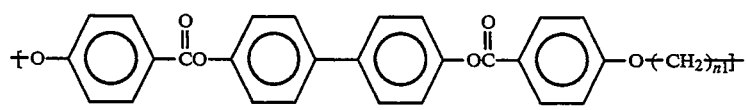  (10)
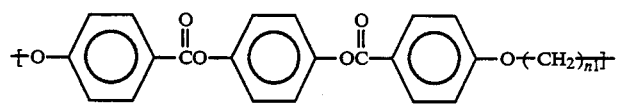  (11)
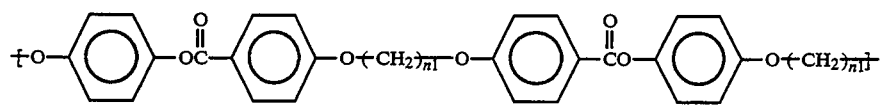  (12)
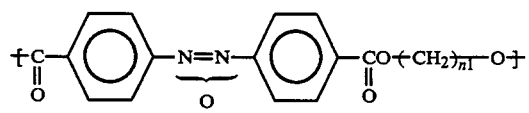  (13)
(In the following formulas (14)–(17), p=5–1000, p1+p2=5–1000, q=1–16, q1=1–16 and q2=1–16.)

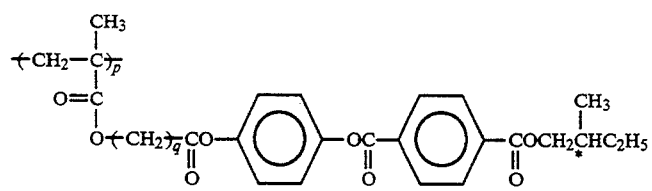
(14)
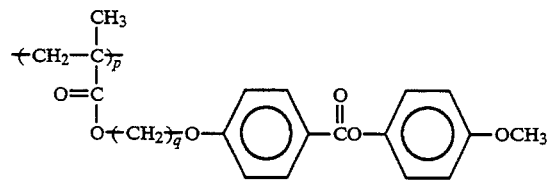
(15)
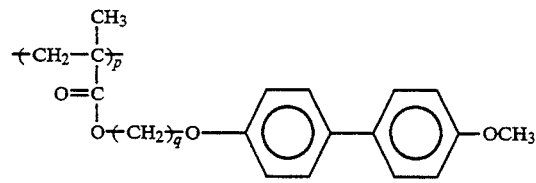
(16)
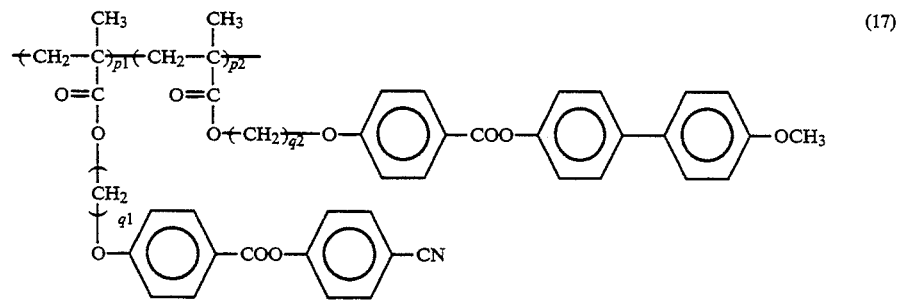
(17)
(In the following formulas (18)–(62), * denotes the location of an asymmetric carbon atom, and $n2 = 5-1000$.)
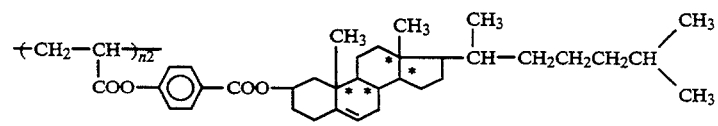
(18)
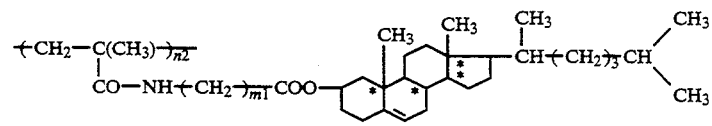
(19)
($m1 = 2-10$)
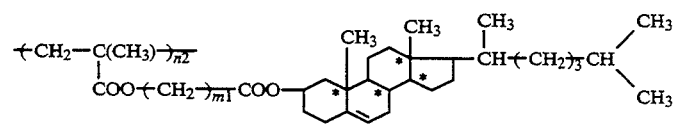
(20)
($m1 = 2-10$)
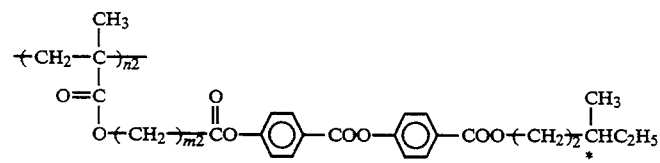
(21)
($m2 = 2-15$)

-continued
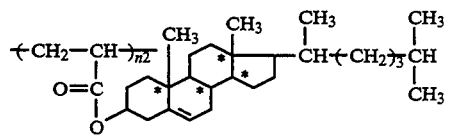 (22)
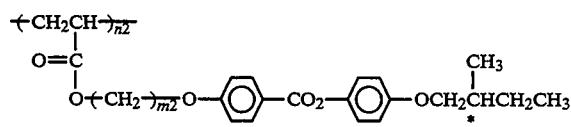 (23)
(m2 = 2-15)
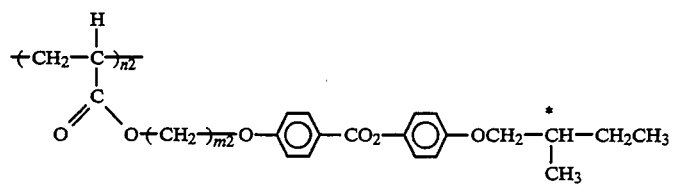 (24)
(m2 = 2-15)
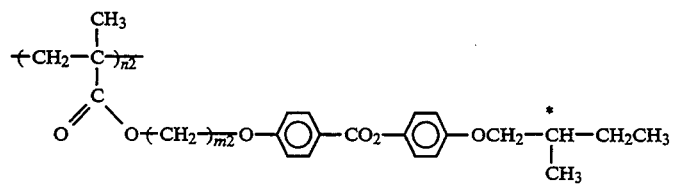 (25)
(m2 = 2-15)
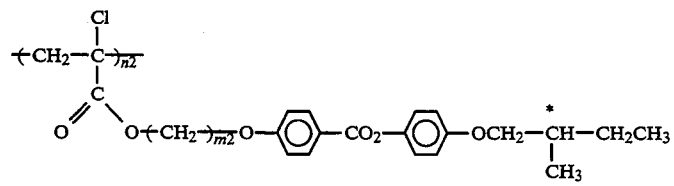 (26)
(m2 = 2-15)
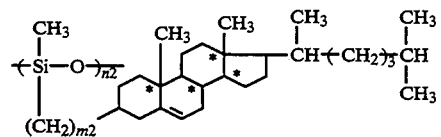 (27)
(m2 = 2-15)
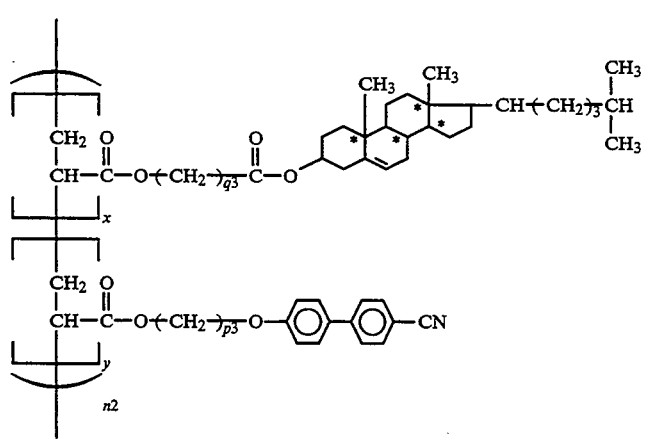 (28)
(x + y = 1, q3 = 1-10, p3 = 1-10)

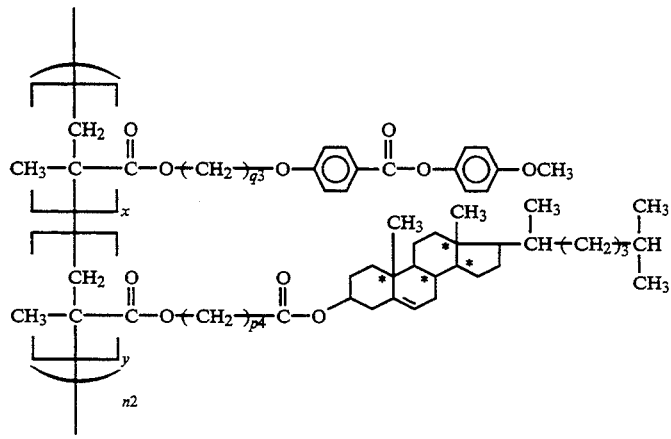
(29)
(x + y = 1, q3 = 1–10, p4 = 1–15)
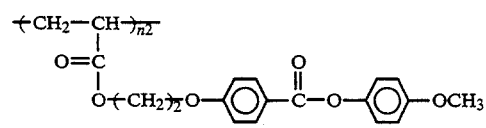
(30)
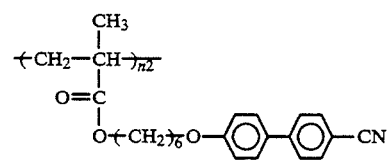
(31)
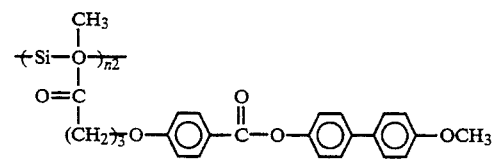
(32)
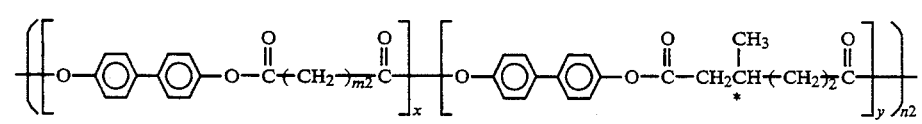
(33)
(m2 = 2–15, x + y = 1)
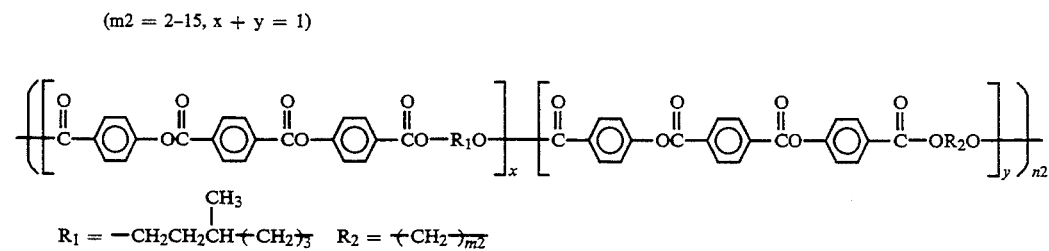
(34)
$R_1 = -CH_2CH_2\overset{*}{C}H(CH_3)(CH_2)_3$   $R_2 = (CH_2)_{m2}$
(x + y = 1, m2 = 2–15)
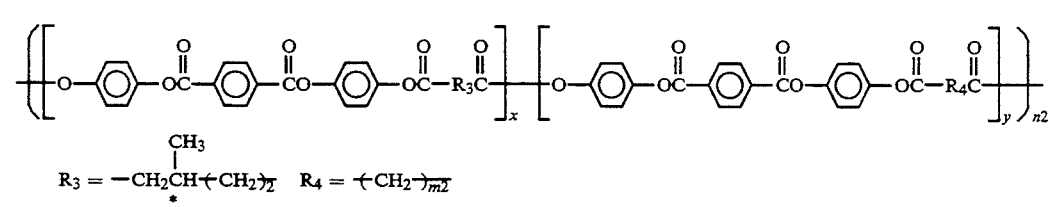
(35)
$R_3 = -CH_2\overset{*}{C}H(CH_3)(CH_2)_2$   $R_4 = (CH_2)_{m2}$
(x + y = 1, m2 = 2–15)

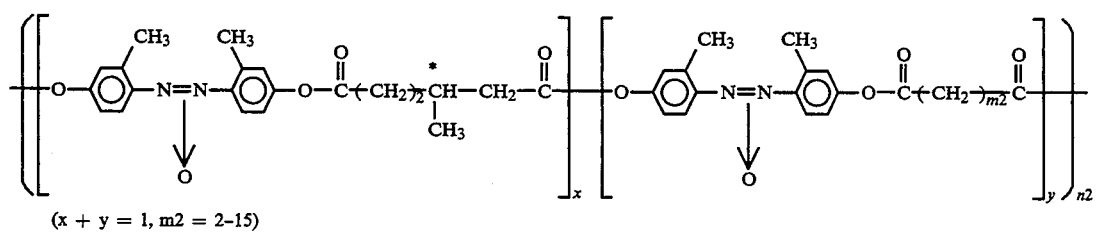 (36)
(x + y = 1, m2 = 2-15)
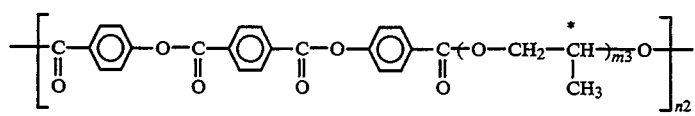 (37)
(m3 = 1-5)
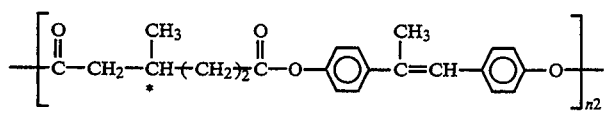 (38)
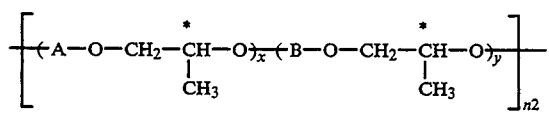 (39)
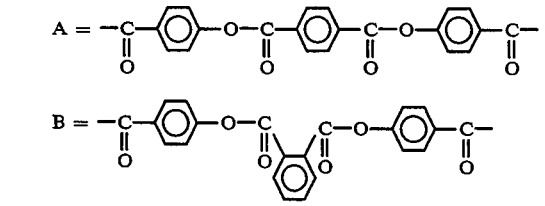
(x + y = 1)
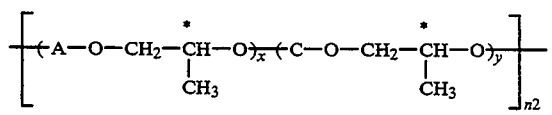 (40)
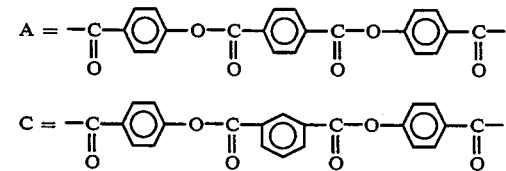
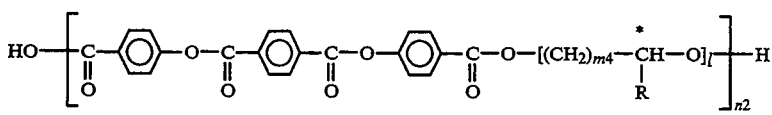 (41)
(m4 = 1-3, $\underline{l}$ = 1-20)
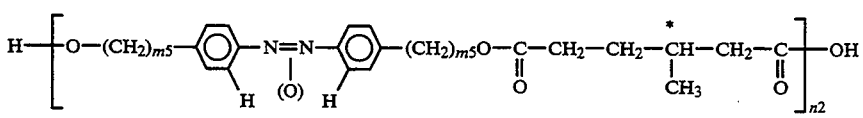 (42)
(m5 = 0-5)

-continued

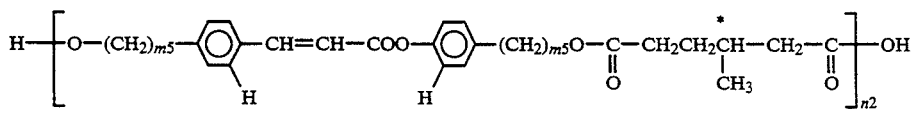
(43)

(m5 = 0-5)

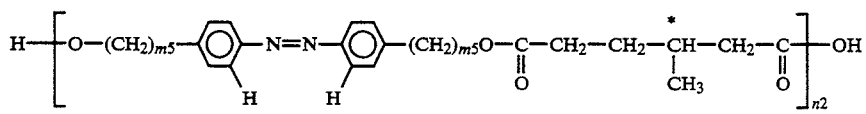
(44)

(m5 = 0-5)

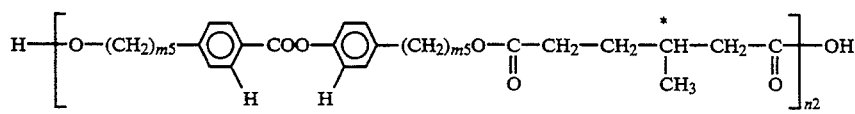
(45)

(m5 = 0-5)

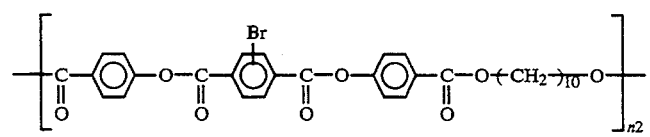
(46)

The above polymer liquid crystals can be used singly or in a mixture of two or more species. It is also preferable to mix a low-molecular weight liquid crystal with such a polymer liquid crystal to control the refractive index.

A polymer liquid crystal having a ferroelectric liquid crystal phase is preferred because it allows a high-speed writing under an electric field to provide a higher productivity.

Examples of ferroelectric polymer liquid crystals may include those represented by the following formulas:

The above polymer liquid crystal or its composition may preferably be one having a glass transition point so as to stably retain memorized data. It is particularly preferred to store written data below the glass transition temperature in view of stable storability of the data.

The memory layer may have a thickness of 0.05–10 μm, preferably 0.1–5 μm, and may be easily formed on a substrate by dipping, bar coating, spin coating, etc.

For the purpose of initial alignment of the polymer liquid crystal constituting the memory medium according to the present invention, it is possible to use an alignment film, which may be a film having a homogeneous

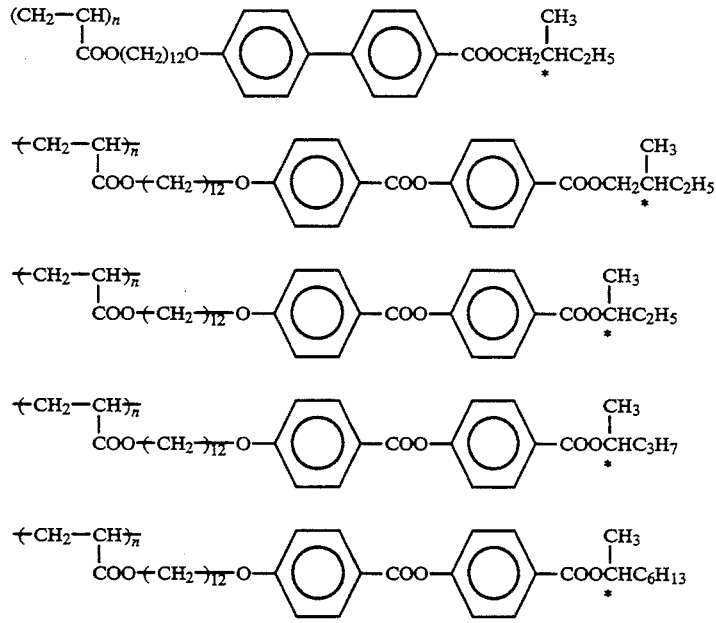

alignment characteristic of, e.g., a polymer film, such as polyvinyl alcohol, polyimide, polyamide or polyamide-imide, or an oblique vapor-deposition film of an inorganic material, such as SiO$_2$. It is possible to subject such an alignment film to a uniaxial aligning treatment, such as rubbing. Uniaxial aligning treatment may also be effected by shearing. It is also possible to apply a homeotropic aligning treatment, such as a silane coupling agent, lecithin, poly(vinylidene fluoride-tetrafluoroethylene) copolymer, poly(vinylidene fluoride-trifluoroethylene) copolymer, etc.

The reflection layer for reflecting a beam having passed through the memory layer and having the reflected beam re-enter the memory layer may comprise metal film of Al, Au, Ag, etc., or a dielectric mirror, in a thickness of 0.01–100 μm, preferably 0.05–10 μm.

The substrate may be a plate or a sheet of glass, plastic, etc.

The memory medium according to the present invention may be initially subjected to writing so as to provide a memory medium which may be exchangeable with a conventional digital audio disk. The writing may be effected by heat-mode by using a laser beam, an electric field alone or a combination of heat-mode writing and an electric field. Further, it is also possible to utilize an optical alignment due to a third-order non-linear susceptibility by means of strong laser light.

In order to effect the reproduction by interferential diffraction, it is necessary to make the width of a record pit having a varied refractive index narrower than the spot diameter of the reproduction beam incident on the memory layer. For this purpose, it is preferred to use a writing beam of, e.g., short-wavelength laser light, having a smaller spot or pit diameter than that of the reproduction beam. Alternatively, it is also effective to use a writing beam having a radial Gaussian intensity distribution to provide a thermal distribution pattern in the memory layer, thus forming in the memory layer a record pit having a varied refractive index in a width smaller than the spot diameter of the writing beam. A polymer liquid crystal has a clear threshold temperature for a phase transition and also a low heat conductivity, so that it is easy to effect a spot or pit recording in a width (or diameter) smaller than the spot diameter of a laser beam having a radial intensity distribution. In case of such a smaller spot recording, the resultant spot or pit is liable to yield a degraded reproduction signal, but a good reproduction signal can be obtained even in such a case by utilizing interferential diffraction. In order to use interferential diffraction for reproduction, a phase difference of λ/4–λ/8 (λ: wavelength of reproduction light) is used. Such a phase difference can be obtained by a relatively small memory layer thickness by using a polymer liquid crystal which shows a large refractive index change accompanying a phase transition, and thus a record pit having a width smaller than the spot diameter of the writing beam can be effected further easily.

The above writing beam and reproduction beam can be issued from the same light source. In such a case, the intensities and/or effective pulse durations (depending on unit pulse duration and number of pulses which may be arbitrarily selected) of the respective beams may be made different from each other.

Preferred examples of the light source used for the above purpose may include gas lasers, such as He-Ne gas laser and Ar$^{2+}$ gas laser; solid lasers, such as ruby laser, glass laser and YAG laser, and also semiconductor lasers. Further, the second harmonic or third harmonic of such laser light can be used for providing coherent light of a shorter waveform.

In order to use such a laser beam for writing in a memory layer according to the heat mode, it is desired to incorporate a dye showing a selective absorptivity for a laser beam used in the memory layer. Examples of dyes used for the purpose may include those represented by the following formulas.

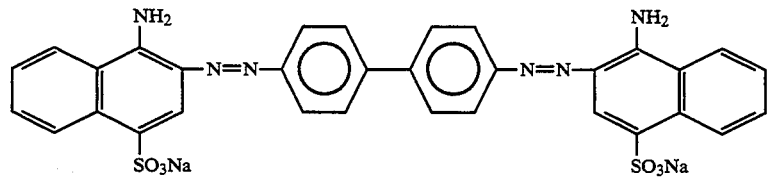

Direct Red 28

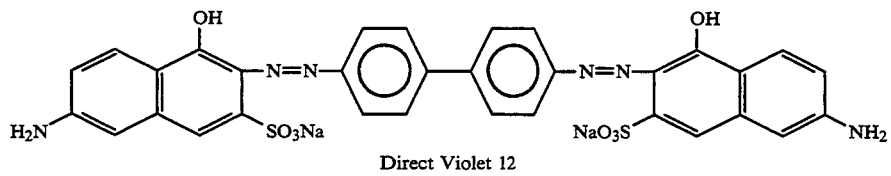

Direct Violet 12

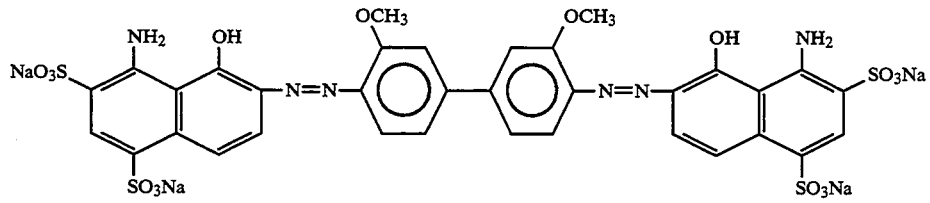

Direct Blue 1

-continued
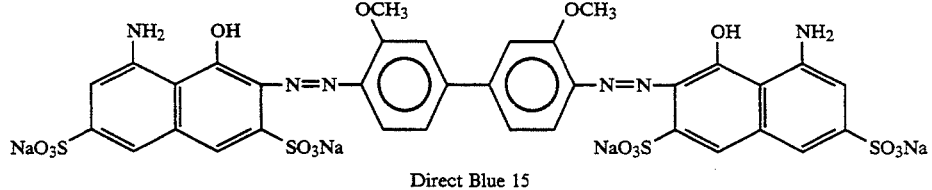
Direct Blue 15
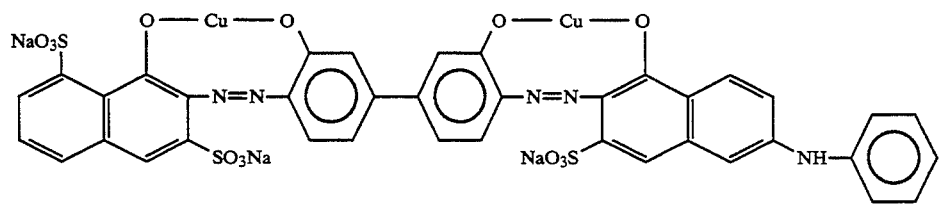
Direct Blue 98
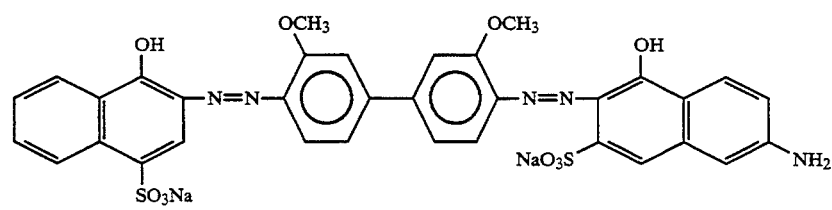
Direct Blue 151
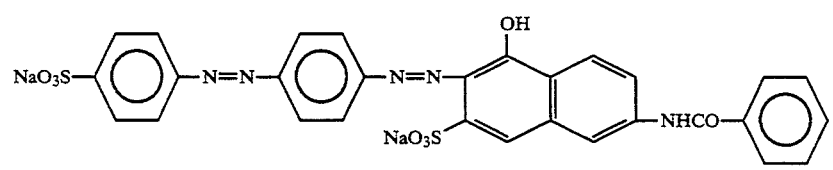
Direct Red 81
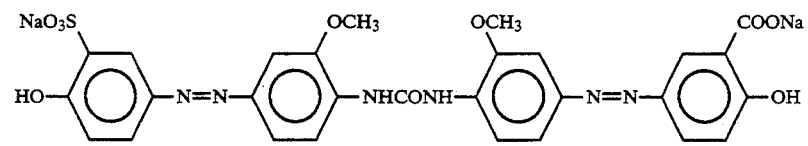
Direct Yellow 44
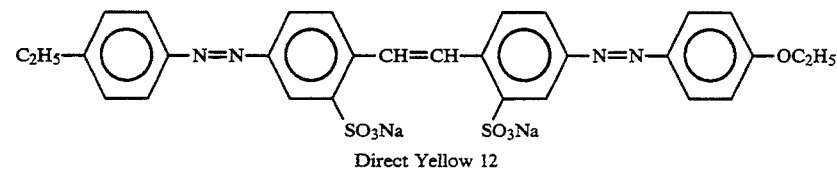
Direct Yellow 12
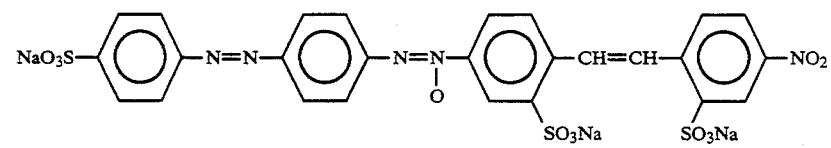
Direct Orange 39
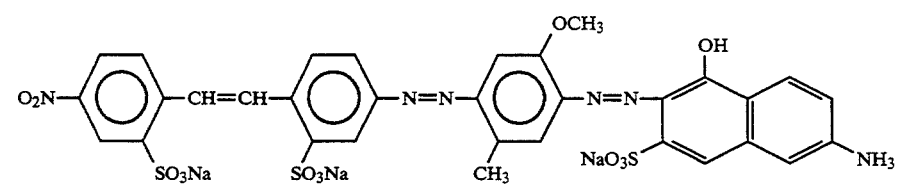

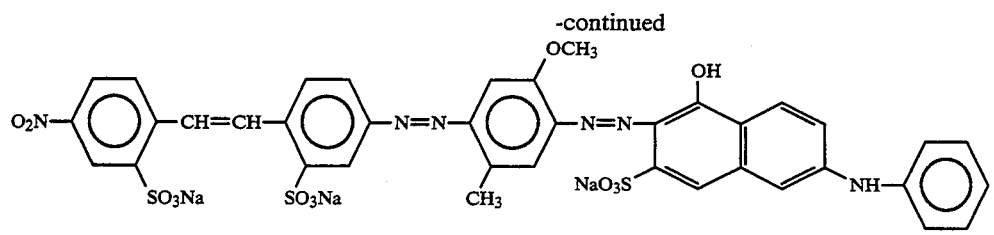
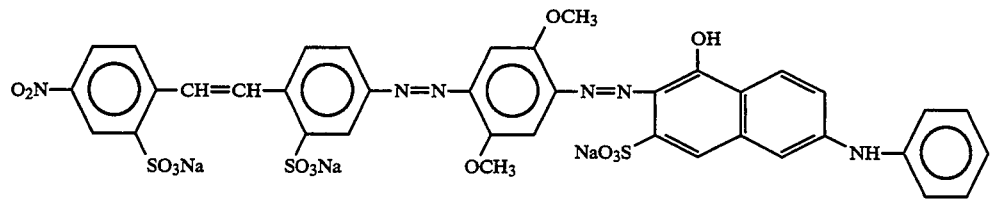
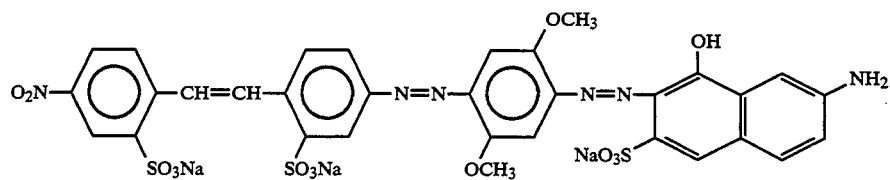
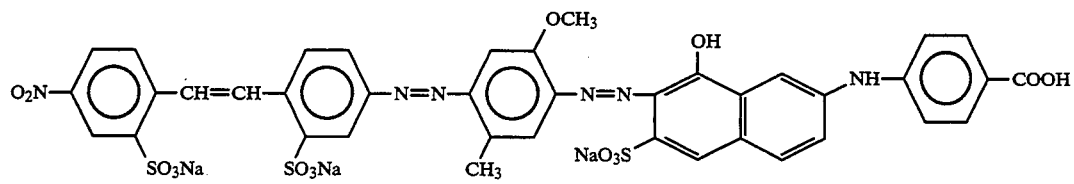
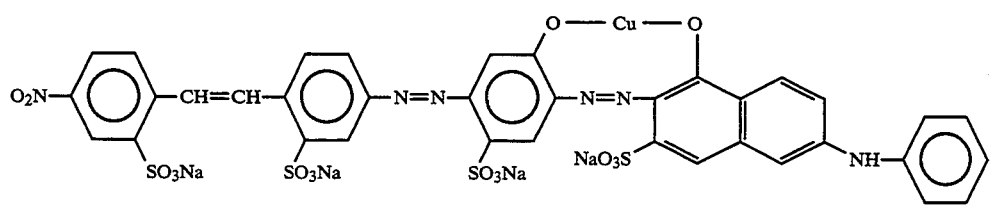
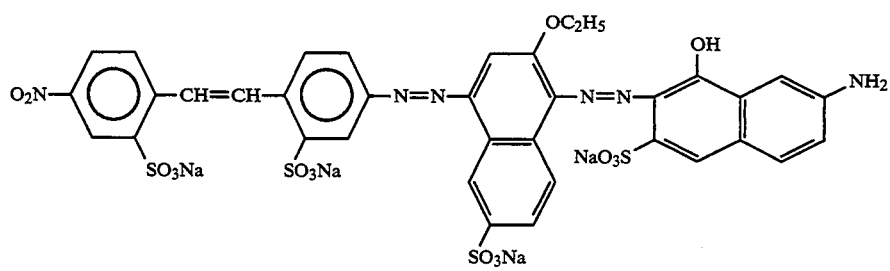
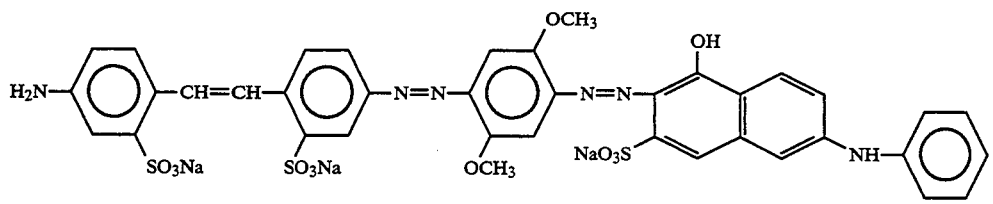
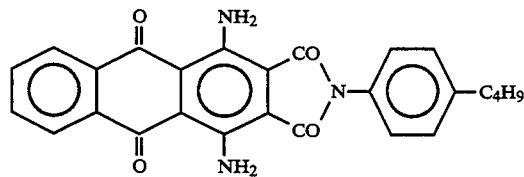

-continued
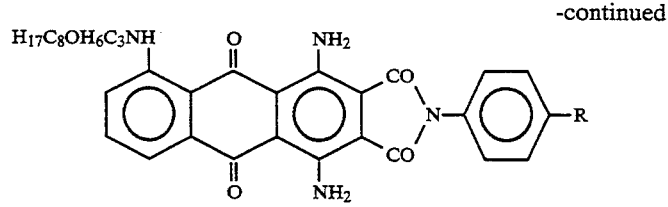
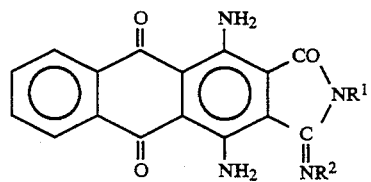
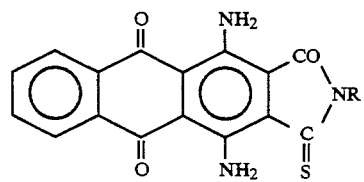
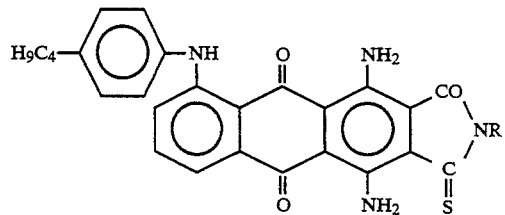
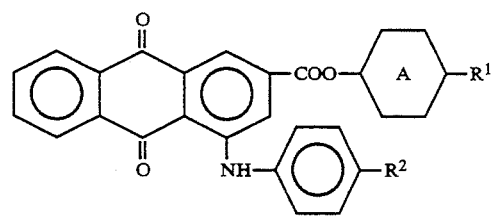
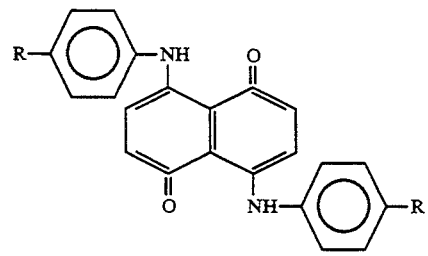
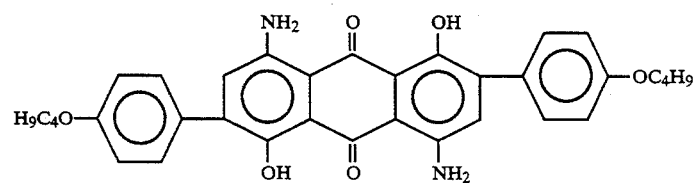
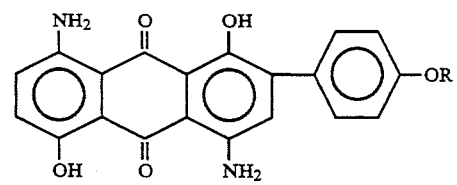

-continued
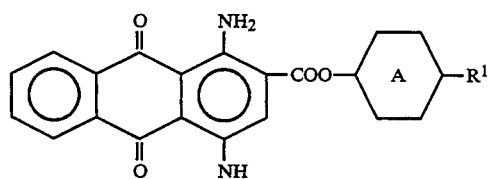
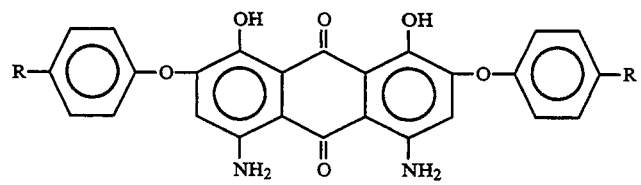
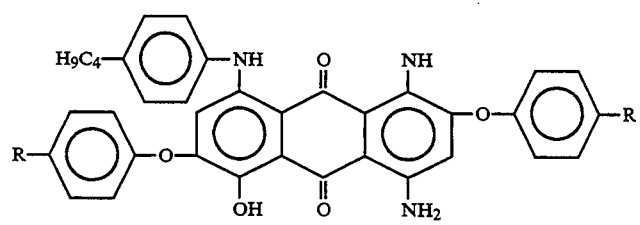
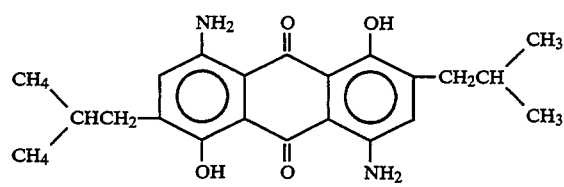
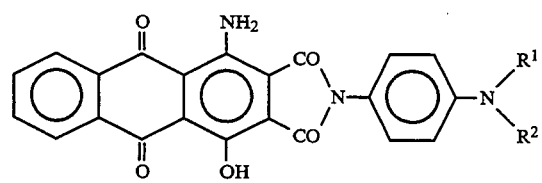
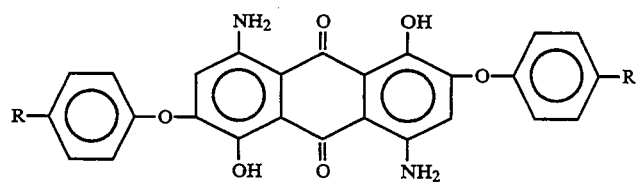
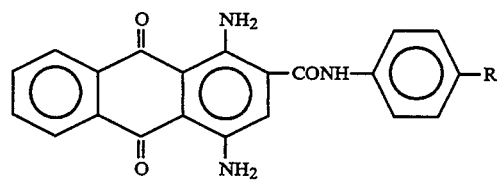
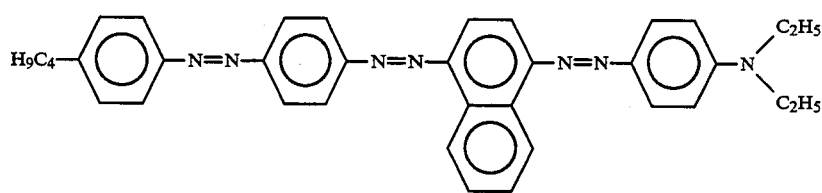

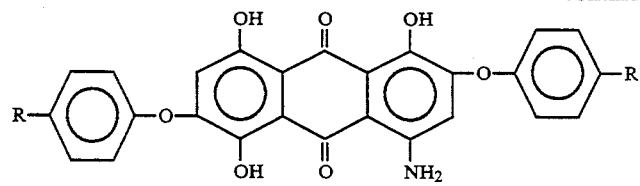
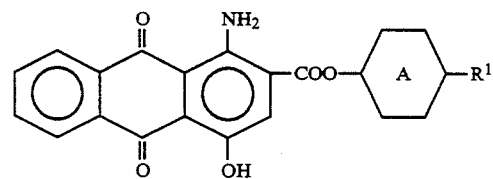
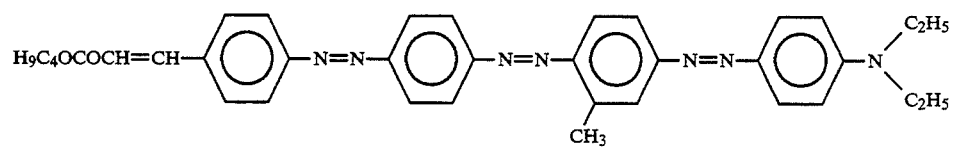
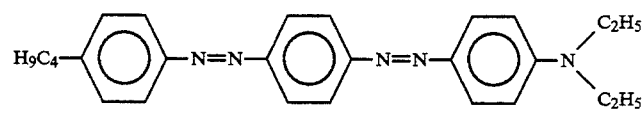
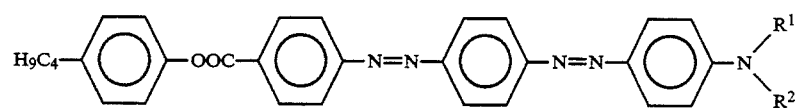
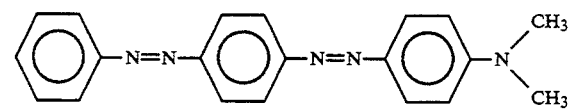
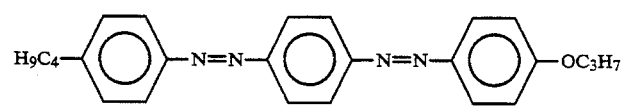
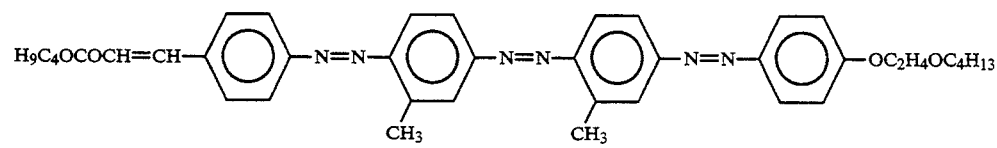
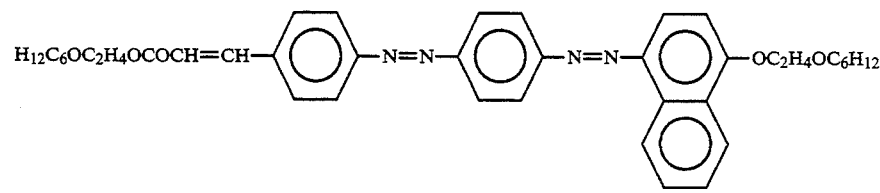
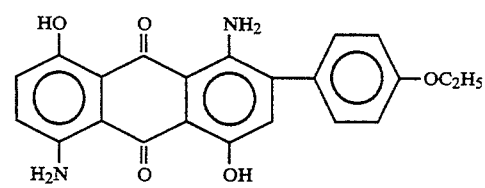
Disperse Blue 214

-continued
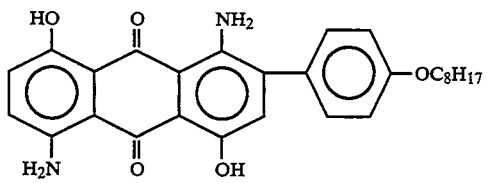
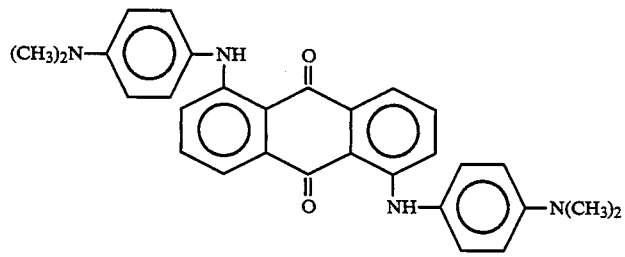
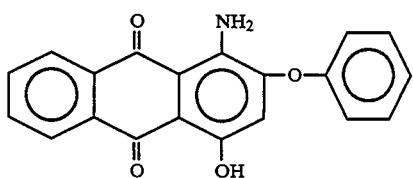
Disperse Red 60
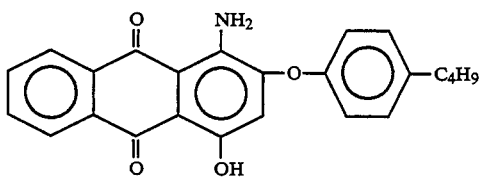
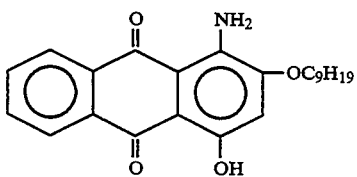
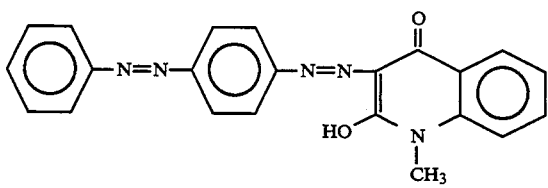
Disperse Yellow 56
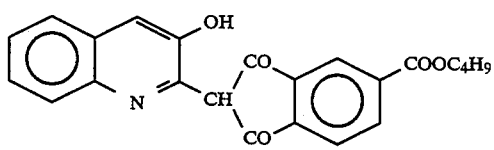

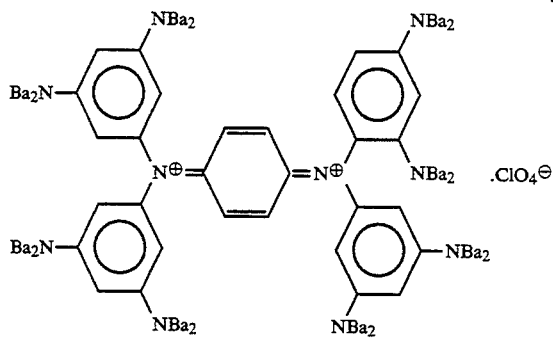

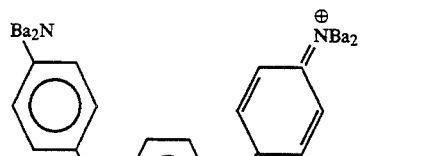

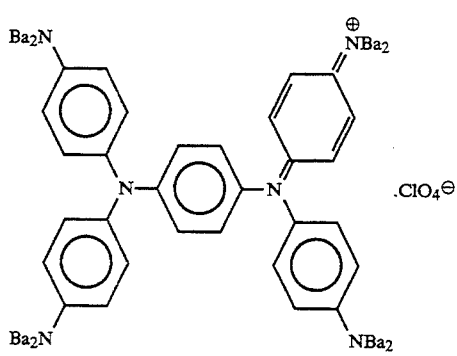

The memory layer comprising a polymer liquid crystal (composition) according to the present invention may be provided with a record portion and a non-record portion having different optical thicknesses through a refractive index change at the record portion, whereby coherent light causes interferential diffraction at the boundary between the record portion and the non-record portion. The record portion and non-record portion may preferably be formed as a combination of two phases selected from, e.g., the following phases of a polymer liquid crystal.

(1) isotropic phase,
(2) homeotropically aligned nematic phase,
(3) homogeneously aligned nematic phase,
(4) homeotropically aligned smectic phase,
(5) homogeneously aligned smectic phase,
(6) homogeneously aligned cholesteric phase,
(7) focal-conically aligned cholesteric phase,
(8) homogeneously aligned chiral smectic phase,
(9) homeotropically aligned chiral smectic phase.

These phases may be formed by adjustment of writing conditions either by direct heating or preferably heating by laser beam irradiation under or in the absence of an electric field, etc., and may be fixed preferably by cooling below the glass transition temperature. The thickness (d) of the memory layer may be controlled in advance to provide an optical thickness difference ($\Delta n \cdot d = \lambda/4 - \lambda/8$) suitable for readout between the record portion showing a refractive index $n_1$, and the non-record portion showing a refractive index $n_2$ depending on the resultant refractive index difference $\Delta n$ ($= |n_1 - n_2|$). The refractive index difference may preferably be 0.01 or above, particularly 0.05 or above, so as not to require an excessively large thickness of the recording layer for providing an optimum optical thickness difference. The upper limit of the refractive index difference may be governed by a particular polymer liquid crystal used and generally 0.4 or below. The resultant optical thickness difference between the record portion and the non-record portion is reproduced by interferential diffraction of linearly polarized light, circularly polarized light and non-polarized light having a coherency.

The present invention will be explained more specifically with reference to Examples.

EXAMPLE 1

FIG. 1 shows an embodiment of a recording and reproduction apparatus using a memory medium according to the present invention.

A memory medium 5 comprising a transparent substrate 6 and a memory layer 7 comprising a polymer liquid crystal and a reflection layer 8 disposed on the substrate is irradiated, e.g., by a laser beam of 830 nm and 20 mW from a laser 1 to form record pits 7b each having a width of 0.4 μm and surrounded by a non-record portion 7b in the memory layer 7. The thickness (d) of the memory layer 7 is controlled provide an optical thickness difference (Δn.d) of $\frac{1}{4}\lambda - \frac{3}{8}\lambda$ with respect to the wavelength (λ) of a reproduction beam described below between the record pits 7b and the surrounding non-record portion 7a having a refractive index difference (Δn).

A continuous reproduction beam of 830 nm and 1 mW from the laser 1 is caused to pass through a polarization beam splitter 2, a quarter wave plate 3 and an objective lens 4 to be focused onto the memory layer 7 having the record pits of the memory medium 5 through the substrate 5.

The spot laser beam incident to the memory medium 5 is transmitted through the memory layer 7, reflected at the reflection layer 8 and re-transmitted through the memory layer 7 to enter the objective lens 4. When the spot beam having a spot diameter of, e.g., 1.2 μm which is larger than the width (e.g. 0.4 μm) of a record pit 7b strides over the record pit, a portion of the spot beam passing through the record pit 7b is caused have an optical path difference of a half the wavelength of the reproduction beam (e.g., a phase difference of π) with a portion of the beam having passed through the non-record portion 7a during the reciprocation through the memory layer 7 on the surface of the substrate 6. These portions of the spot beam both reflected from the reflection layer 8 causes interferential diffraction with each other to remarkably decrease the quantity of reflected light incident to the objective lens 4. The reflected light quantity is detected by a detection optical system similar to a conventional CD pickup optical system including a detector 9.

The above-mentioned record pit width of, e.g., 0.4 μm and reproduction beam spot diameter of, e.g., 1.2 μm have been determined so as to provide a maximum interferential diffraction effect.

The above-mentioned optical thickness between the record refractive index pit and the non-record portion provides a maximum signal 8/N ratio when it is approx. $\frac{1}{4}$ of the wavelength of the reproduction beam as is known with the conventional CD technology. However, an optical thickness of approx. $\frac{3}{8}$ of the wavelength is preferred so as to effect a tracking control detection according to the push-pull method. As a result, it is desired that the optical thickness difference is generally within the range of $\frac{1}{4}-\frac{3}{8}$ of the wavelength of the reproduction beam.

The memory medium may be formed in the shape of the disk in the same size as a conventional CD disk, and the formation of the refractive index pit at the time of recording may be effected according to a similar format as the pit formation of the CD disk, whereby a disk-shaped memory medium applicable to a conventional CD drive unit can be obtained.

EXAMPLE 2

Figure 2:
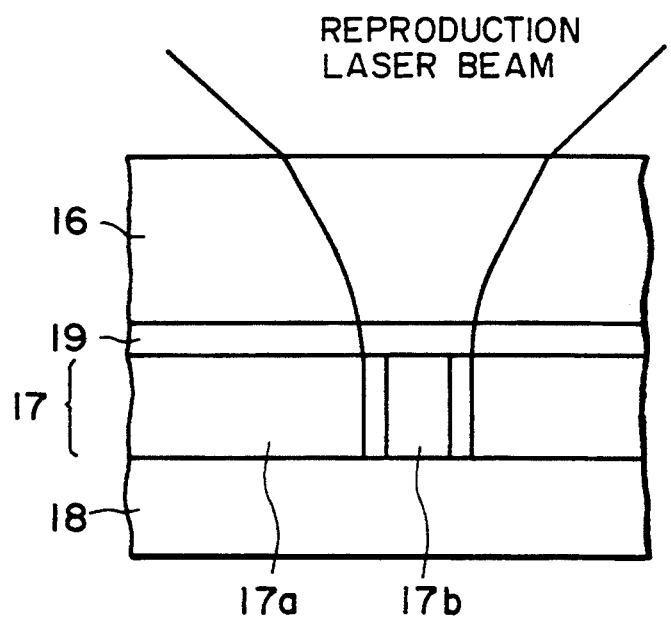
FIGS. 2 and 3 are respectively a partial schematic sectional view of an embodiment of the memory medium according to the present invention.

An embodiment of the memory medium having a laminar structure as shown in FIG. 2 was prepared in the following manner.

A substrate 16 was coated with a methanol solution of a silane coupling agent (Toray Silicone SZ 6032) by spin coating, followed by curing to form a homeotropic alignment film 19.

Then, the following polymer liquid crystal

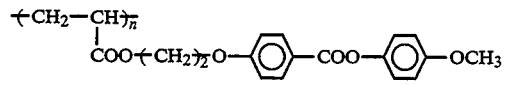

was dissolved in dichloroethane at a concentration of 5 wt. %, and into the solution, the following near infrared-absorbing dye

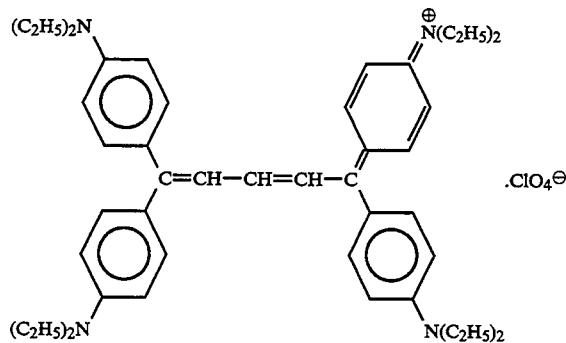

was dissolved in a proportion of 1 wt. % of the polymer liquid crystal. The resultant solution was applied onto the alignment film 19 by spin coating and dried to form a memory layer 17, followed by vapor deposition of Al to form an approx. 2 μm-thick reflection layer. Then, the memory layer 17 was heated into isotropic phase and then cooled to form a homeotropically aligned memory layer 17. Then, the memory layer 17 was irradiated for writing with a laser beam of 830 nm and 20 mW from a semiconductor laser 1 in FIG. 1 to form a record pit 17b having a width of 0.8 μm surrounded by a non-record portion 17a.

The memory medium was incorporated in a readout system as shown in FIG. 1 and the memory layer 17 was illuminated with a reproduction beam of 830 nm and 1 mW having a spot diameter of 2.4 μm, whereby the reflected light quantities were measured to be 5% and 40% with respect to the illumination light for the record pit 17b and the non-record portion 17a, respectively.

EXAMPLE 3

Figure 3:
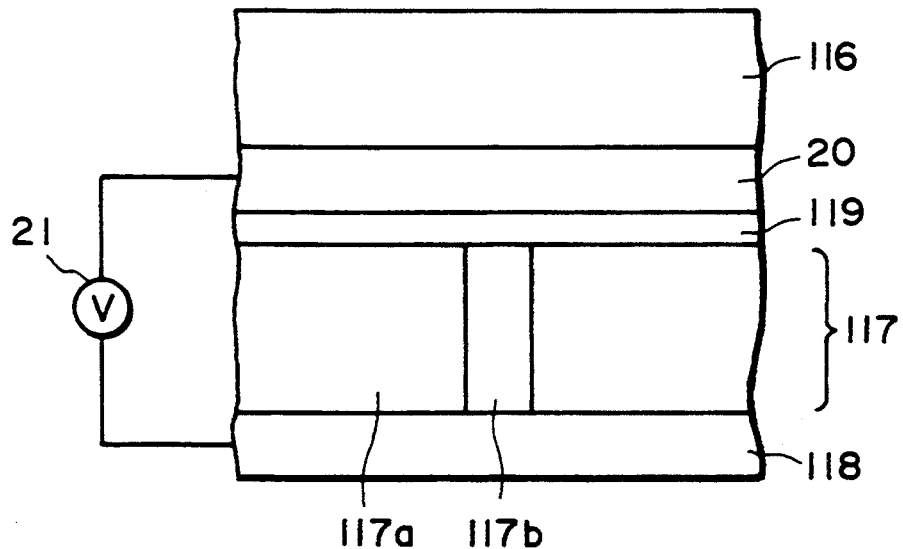

Another embodiment of the memory medium according to the present invention was prepared as shown in FIG. 3.

A substrate 116 coated with a vapor-deposited ITO transparent electrode 20 formed by sputtering was further coated with a polyamic acid solution ("PIQ", mfd. by Hitachi Kasei Kogyo K. K., non-volatile matter content: 3.0 wt. %), followed by heating for 30 min. at 120° C. 60 min. at 200° C. and 30 min. at 350° C., to form a polyimide alignment film 119, which was then provided with a uniaxial alignment characteristic by rubbing.

Then, the following polymer liquid crystal

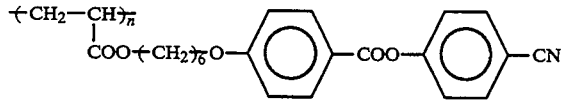

was dissolved in dichloroethane at 5 wt. %, and the following dichroic colorant

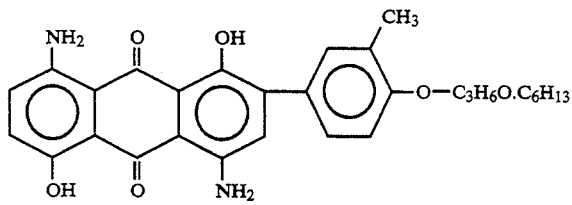

was added thereto in a proportion of 1 wt. % of the polymer liquid crystal, and the resultant solution was applied by spin coating, followed by drying to form a memory layer 117, which was then covered by a 2 μm-thick vapor deposition layer of Al to form a reflection layer 118. The memory layer 117 in the memory medium was heated into isotropic phase and then gradually cooled to form a homogeneously aligned memory layer. Then, the memory layer 117 was irradiated for writing with an He-Ne laser beam of 633 nm and 10 mW under application of an AC electric field from an AC supply between the transparent electrode 20 and the reflection layer 118.

The thus written memory medium was incorporated in a reproduction system using a reproduction laser beam of 830 nm and 1 mW shown in FIG. 1, whereby the reflected light quantities from the recorded and the non-recorded portions were measured to be 10% and 35%, respectively.

As described above, according to the present invention, there is provided a memory medium which can be used in a simple optical system as used in a conventional digital audio disk apparatus. The memory medium can be prepared by a very simple process such as spin coating and can be easily written and erased, so that it constitutes a good memory medium suitable for production in a small scale.

What is claimed is:

1. An information reproduction apparatus, comprising:
   a memory medium including a memory layer comprising a polymer liquid crystal and a reflection layer disposed on a substrate, the memory layer comprising a record pit formed by irradiation with a writing optical beam, thereby providing said pit with a width and a refractive index which is different from that of a neighboring non-record part,
   a means for irradiating the record pit with a reproducing optical beam having a spot diameter larger than the width of the record pit, and
   a means for detecting interferential diffraction of a reflected beam from the record pit to reproduce recorded data.

2. A apparatus according to claim 1, wherein said polymer liquid crystal has a glass transition point.

3. An apparatus according to claim 1, wherein said optical beam has a radial Gaussian intensity distribution.

4. An apparatus according to claim 1, further comprising:
   a writing means for irradiating the memory layer with a writing beam to form in the memory layer said record pit.

5. An apparatus according to claim 4, wherein the width of the record pit is smaller than the spot diameter of the writing beam.

6. An apparatus according to claim 5, wherein the writing beam and the reproducing optical beam are issued from a single light source.

7. An apparatus according to claim 6, wherein the writing beam and the reproducing optical beam have different light intensities and/or different pulse durations.

* * * * *

UNITED STATES PATENT AND TRADEMARK OFFICE
CERTIFICATE OF CORRECTION

PATENT NO. : 5,339,306

DATED : August 16, 1994

INVENTOR(S) : Kazuo Yoshinaga, et al.

It is certified that error appears in the above-indentified patent and that said Letters Patent is hereby corrected as shown below:

On the title page, item:

[56] References Cited

FOREIGN PATENT DOCUMENTS, "1040380 1162245 2059394" should read --64-40380 1-162245 2-59394--.

COLUMN 1

Line 30, "of" should read --at--;
Line 31, "the" and "at" should be deleted; and
Line 49, "compli-" should read --more compli- --.

COLUMN 2

Line 59, "$1 \leq n_i \leq 15)$" should read --$1 \leq n_i < 15)$--

COLUMN 31

Line 6, "provide" should read --to provide--;
Line 25, "have" should read --to have--; and
Line 32, "causes" should read --cause--.

UNITED STATES PATENT AND TRADEMARK OFFICE
CERTIFICATE OF CORRECTION

PATENT NO. : 5,339,306
DATED : August 16, 1994
INVENTOR(S) : Kazuo Yoshinaga, et al.

It is certified that error appears in the above-indentified patent and that said Letters Patent is hereby corrected as shown below:

<u>COLUMN 34</u>

Line 19, "A" should read --An--.

Signed and Sealed this

Thirtieth Day of May, 1995

*Attest:*

BRUCE LEHMAN

*Attesting Officer*　　*Commissioner of Patents and Trademarks*